Figure 1:
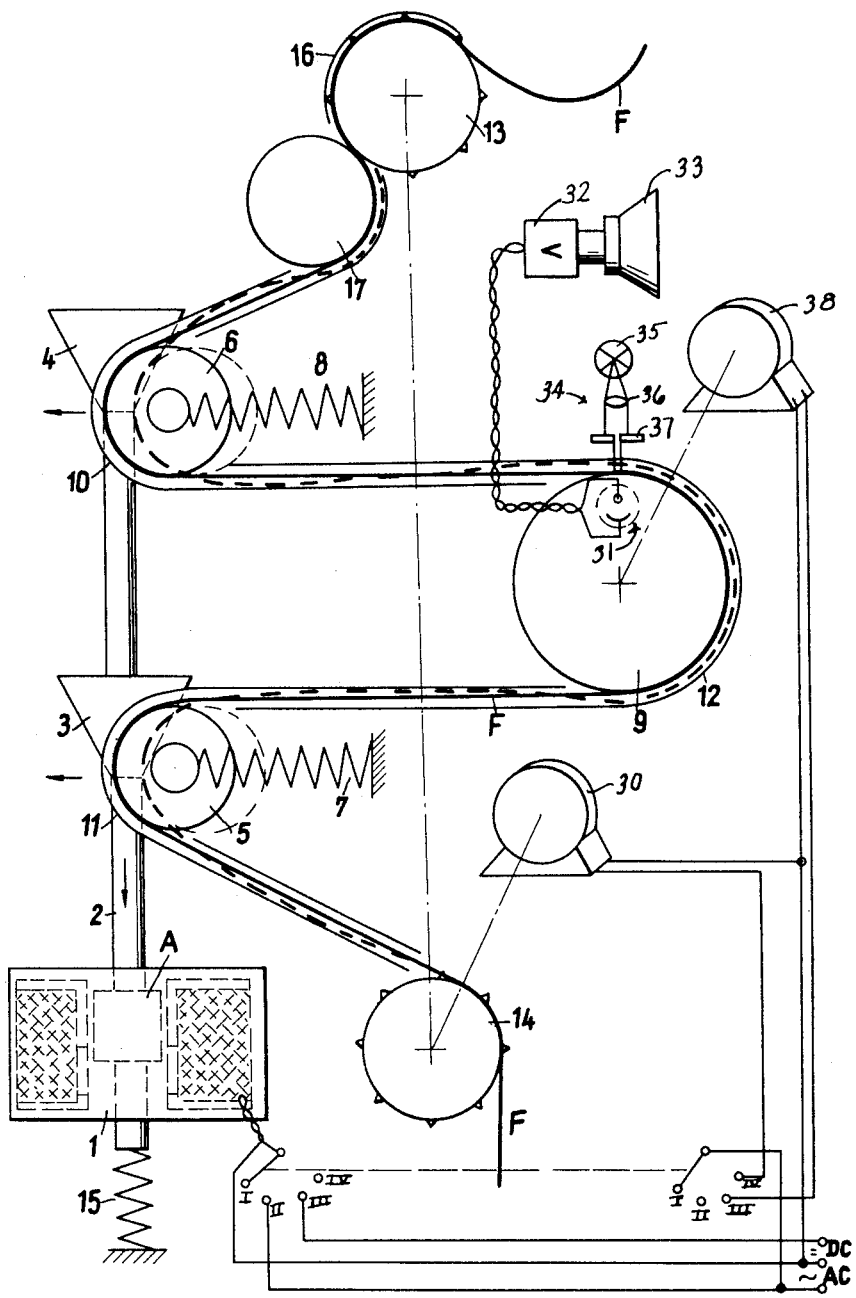

Inventors
Alfred Eisinger
Heinrich Zahn
by Michael J. Striker
ATTY

United States Patent Office 3,166,755
Patented Jan. 19, 1965

3,166,755
MEANS FOR FEEDING A KINEMATOGRAPHIC
FILM IN SOUND FILM APPARATUS
Alfred Eisinger, Griesheim, near Darmstadt, and Heinrich
Zahn, Darmstadt, Germany, assignors to Fernseh
G.m.b.H., Darmstadt, Germany
Filed Sept. 7, 1961, Ser. No. 136,593
Claims priority, application Germany, Sept. 10, 1960,
F 32,083
5 Claims. (Cl. 352—27)

This invention relates to sound-film apparatus, that is to apparatus in which both pictures and accompanying sound are to be reproduced from a single kinematographic film. In apparatus of this kind it is customary for the film, after passing through the gate in which it is projected, to pass over a guide roller, over a sound drum connected with a flywheel which assists in keeping the film speed constant while the sound track is scanned to derive the recorded sound signal, and over a second guide roller before passing to the take-up spool. The invention is especially applicable to apparatus of this kind in which rapid starting of the film is desirable.

When providing the rapid starting of such apparatus there was formerly the difficulty that the sound drum and its associated flywheel were stationary before the film pulldown mechanism was started and had to be set in motion during the run-up period by the friction of the film on the sound drum; in consequence a relatively long time elapsed before the sound drum had attained synchronous speed and the apparatus could be taken into use.

It is an object of the invention to provide a novel and improved method of starting a motion picture film with sound track by switching at first to a stand-by position in which the sound drum is quickly accelerated and then switched over to running position and to press the just started film on the already running sound drum. The method according to the invention comprises the first step of bringing said motion picture apparatus into a stand-by position by energizing the driving motor of the sound drum so that it begins to rotate and of lifting the loop of film which under normal running conditions embraces the sound drum from said sound drum so that it rotates freely without rubbing against the not running film and the second step of bringing said picture apparatus from stand-by to running position by starting the driving mechanism of said sound film comprising two driving means running with constant speed one of each arranged before and one behind said sound drum, and displacing two guide rollers, one between the first driving means and sound drum, the other between sound drum and the second driving means such as to press the running film against the rotating sound drum. When returning from running to stand-by position the guide rollers are moved back such as to release said film from engagement with said sound drum and the film driving means are stopped after such release.

It is a further object of this invention to provide an arrangement for the purpose set forth which yields more satisfactory results, and in which the aforesaid difficulty may be avoided. A motion picture apparatus according to the invention, in which a motion picture film with sound track is fed past the gate, comprises a rotating sound drum with associated motor, preceding and following guide rollers and sprocket drums with teeth engaging said film. There are also provided means for producing a displacement of said guide rollers such as to release said film from engagement with said sound drum before starting said film and means for raising the speed of said shaft to the synchronous speed appropriate to the speed of movement of said film. Further means are provided for driving said sprocket drums and control means for restoring said guide rollers to their initial position in which they cause said film to engage said sound drum, said control means becoming operative when said synchronous speed has been attained.

When the film transport mechanism with which the sound drum is associated is of the self-threading type it is advantageous to arrange that the guide rollers can be set into oscillatory movement in directions making an acute angle with the direction of film movement.

In a preferred embodiment of the invention this oscillatory motion has a frequency which is equal to the mains frequency or to a multiple of it.

It is a further object of the invention to provide an arrangement for periodically moving the guide rollers which is comparatively simple in its structure and reliable in operation.

Further objects and advantages of the invention will become apparent to those skilled in the art from the following specification, when taken in conjunction with the accompanying drawings in which an embodiment of the invention is illustrated by way of example.

It is to be expressly understood, however, that the drawings are for the purpose of illustration and description only, and are not intended as a definition of the limits of the invention.

Figure 2:
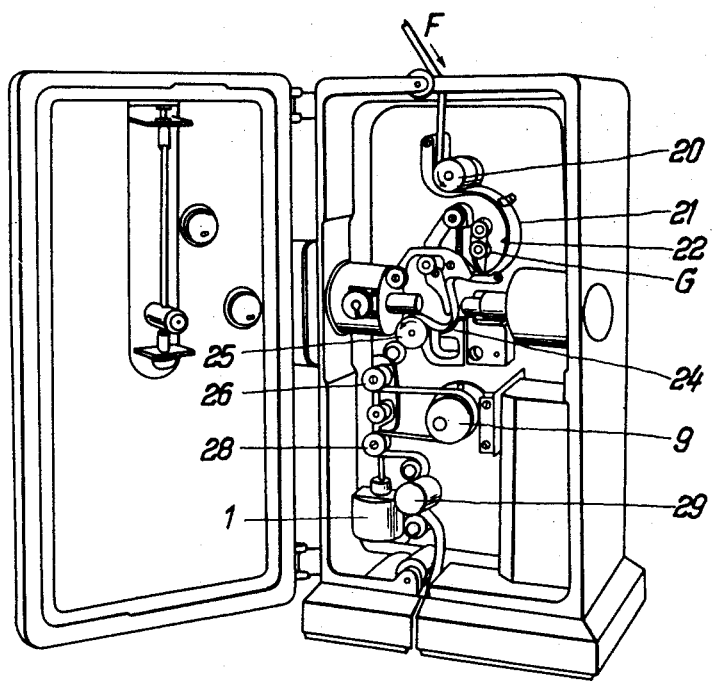

FIGURE 1 is a schematic diagram illustrating the principle of operation of sound film apparatus according to the present invention, and FIGURE 2 is a perspective view of part of one equipment of sound film apparatus embodying the present invention.

In FIGURE 1, device 1 is a magnet which when the film drive motor 30 is stationary is energized to draw a pull-rod 2 downwards against the action of a spring 15. When magnet 1 is energized, wedge-shaped elements 3, 4 carried by pull-rod 2 engage the shafts of two guide rollers 5 and 6, over which the film F passes to engage sound drum 9, and cause these guide rollers to be displaced to the right, that is in the direction of sound drum 9. As a result the loop of film which normally embraces the sound drum is lifted from it and the sound drum, which is provided with a separate motor 38 can rotate freely without rubbing against the film, which now lies against an outer guide member 12. At any time after the sound drum has been accelerated to its correct speed the film drive motor 30 may be started to drive the film through the projection gate. When this occurs, magnet 1 is switched off, as is the starting motor for the sound drum shaft, and the loop of film is drawn back from guide member 12 to embrace sound drum 9. Since the sound drum and film are now moving at the same speed the apparatus may immediately be taken into use.

At 31 there is shown a photocell to which light is supplied from the assembly 34 composed of the lamp 35, lens 36, and gate 37, and the photocell 31 is connected to an amplifier 32 and a loudspeaker 33.

At the end of the film, or when it is desired to stop projection, for example, to show a still picture, the film drive motor 30 may be switched off without difficulty. A rapid-action brake of known type (not otherwise described) stops the film mechanism and thus also the sprockets 13 and 14, in a time of 1/50 second. Simultaneously with the switching off of the current to the film drive motor the current to magnet 1 is switched on so that the magnet is energized and causes guide rollers 5 and 6 to be shifted to the right through the intermediary of pull-rod 2 and wedge members 3 and 4, so that the film is lifted from the sound drum. At the same instant the auxiliary motor on the shaft of the sound drum is switched on to keep it running at the appropriate speed. It thus becomes possible to start and stop the film rapidly at any time, the processes described above being repeated as necessary and the film being laid upon or lifted from the continuously rotating sound drum.

The present invention offers particular advantages in connection with sound film apparatus used in television studios. In sound film apparatus as formerly used in television studios the lapse of time between the switching on of an already threaded-up film projector and the attainment of synchronous speed, that is until the apparatus is ready to be used in normal transmission, amounted to time 4 or 5 seconds in consequence of the sound-head arrangements already described. The use of sound film apparatus according to the present invention makes it possible to shorten this period to some 0.1 second. While it was formerly necessary to switch on the film drive motor of the film scanner some seconds before the instant at which the fade-in of a filmed shot into the transmission in progress was to be made, it is now possible for the producer, by merely actuating a push-button to switch on the film drive motor, to fade in the film picture at any desired instant. This facility is extraordinarily convenient for the producer, especially in the case of film inserts in live transmissions.

FIG. 1 shows the control means in the form of the electrical circuit diagrammatically indicated and including the pair of interconnected switches which can be simultaneously moved through the positions I–IV indicated in FIG. 1. The position I is the off postion where the structure is idle and not operating. The position II is a position for threading the film. It will be noted that when the switch is moved from position I into position II the source of alternating current is connected to the solenoid so that the rollers 5 and 6 will be oscillated.

When the switch is moved to position III, the solenoid is energized by the source of D.C. current so that the guide rollers 5 and 6 are maintained in the dotted position shown in FIG. 1 with the film lifted away from the drum 9, and at the same time it will be noted that the motor 38 is simultaneously energized to drive the drum 9, so that the latter is brought up to speed while the film is out of engagement therewith. It will be seen that at this time the motor 30 is idle so that the sprockets 13 and 14 do not advance the film.

Finally, when the switch is moved to position IV the motor 38 and the solenoid 1 become unenergized while the motor 30 becomes energized so that the film is moved by the return of the rollers 5 and 6 to their operating positions into engagement with the rotating drum 9 so as to be rapidly accelerated while the sprockets 13 and 14 are driven, and of course the drive to the drum 9 is terminated at this time.

In the film transport device shown in FIGURE 2 the film F is drawn by a feed sprocket 20 from a feed spool (not shown) and passes between guide members 21 and 22 so that when the film comes within the range of a claw G the claw engages in the perforations of the film. Transport of the film is now effected by claw G, which urges the film into a space in which by the appropriate form of a clamping member it is urged in the direction of the projection gate. In the projection gate the film in fact passes between the gate proper and a clamping gate, which latter is raised during threading by the action of a device (not shown) specially provided for this purpose. The body 24 which carries the projection gate is shaped in the form of a curve so that it leads the film to a further sprocket 25 (13 in FIGURE 1).

By appropriate formation of a guide member (16 in FIGURE 1) passing around the outside of sprocket 25, and of a further guide member (17 in FIGURE 1) acting as a stripper, the film is constrained to pass around guide roller 26 (6 in FIGURE 1) and into a channel which is formed by two guide members (10 and 12 in FIGURE 1). Through this channel the film passes to embrace sound drum 9, whence it passes through a further channel (formed by members 11 and 12 of FIGURE 1) to a further guide roller 28 (5 of FIGURE 1).

The repeated bending of the film through stationary guide members gives rise to frictional forces on the film which hinder the self-threading action of the film as it is urged on by sprocket 13. In apparatus in accordance with the present invention this self-threading action may be assisted by feeding magnet 1 with alternating current. By this means the pull-rod 2 carrying wedge pieces 3 and 4, and hence the guide rollers 5 and 6, may be set into oscillatory motion. The guide rollers 5 and 6 are caused to execute a small horizontal oscillatory movement under the influence of springs 7 and 8, and this oscillatory movement, which is of very small amplitude causes the film to be urged forward through the guide channels before and after the sound drum until it reaches sprocket 29 (14 in FIGURE 1). Although the movement of the film at each oscillatory movement is small, a large number of these movements (some 50 to 100) are executed every second, so that the time taken for the film to pass through the channels is quite short. If the mains frequency is 50 cycles per second then the number of movements will be 50 or 100; if the mains frequency is 60 cycles per second then the number of movements will be 60 or 120. On leaving sprocket 29 the film leaves the projector pull-down mechanism and may be led by hand to a conventional take-up device.

The use of a film transport mechanism in accordance with the invention makes it possible without difficulty to run the film backwards at any time. It is merely necessary to arrange that during the reverse motion of the film magnet 1 is energized to raise the film loop from the sound drum, which is kept running at its normal speed in the forward direction. This is especially advantageous for use in television studios, since many producers will make use of this facility to mix film shots in with studio action. Usually scenes to be so mixed are spliced together in their correct sequence. If, during rehearsals, a scene must be repeated several times, then it is a great convenience if it is not necessary to remove the film for re-winding after each rehearsal, but for it may be rewound in the projector itself.

What is claimed as new and desired to be secured by Letters Patent is:

1. In a motion picture apparatus, in combination, a rotary drum associated with a sound reproducing device; a pair of film-feeding sprockets respectively located before and after said drum in the path of film movement to and from the drum for feeding the film to and from the drum, respectively; a pair of guide rollers respectively located between said drum and said sprockets and around which the film is guided for movement to and from said drum; spring means operatively connected to said rollers for urging the latter away from said drum to a position maintaining the film in engagement therewith; displacing means cooperating with said guide rollers for displacing the latter in opposition to said spring means from said position toward said drum so that the film due to its inherent resiliency will then lift itself away from said drum; a pair of drive means one of which is connected to said drum and the other of which is connected to said pair of sprockets; and control means operatively connected to said pair of drive means and said displacing means for operating only the drive means connected to said drum and said displacing means so that the drum will be rotated at a given speed while the film is maintained by said displacing means out of engagement with said drum and for then operating the drive means connected to the pair of sprockets while rendering the displacing means inoperative so that after the drum is rotating at said given speed the film is transported by the sprockets and the guide rollers are moved to said position by said spring means thus placing the film in engagement with the drum, whereby the film is very quickly accelerated.

2. In a motion picture apparatus as recited in claim 1, said control means terminating the operation of the drive means connected to said drum when the drive means connected to the pair of sprockets is operated.

3. In a motion picture apparatus, in combination, a rotary drum associated with a sound reproducing device; guide means located adjacent said drum for guiding film to and from the same; a pair of film driving sprockets located before and after said drum and guide means along the path of film movement; a pair of guide rollers respectively located between said sprockets and guide means and around which the film is guided for movement from the sprocket located before said guide means around one guide roller through part of said guide means around the drum through the remainder of the guide means and around the other guide roller to the other sprocket; and means operatively connected to said guide rollers for oscillating the latter toward and away from said drum during threading of the film along said path.

4. In a motion picture apparatus as recited in claim 3, spring means urging said guide rollers away from said drum to an operative position maintaining the film in engagement therewith, and said oscillating means including a solenoid having an armature carrying wedge members for respectively engaging said guide rollers to displace the latter in opposition to said spring means toward said drum when the solenoid is energized so that the film will due to its inherent resiliency then lift itself away from the drum, and a source of alternating current connected to said solenoid for energizing and deenergizing the latter with a frequency determined by the frequency of the alternating current so that the armature and thus the guide rollers will be oscillated when the alternating current is applied to the solenoid.

5. In a motion picture apparatus as recited in claim 1, guide means located between said guide rollers and drum for guiding the film for movement between said guide rollers and drum; and means actuated by said control means for rendering said displacing means operative and inoperative with a frequency which oscillates said guide rollers to facilitate threading of the film.

References Cited by the Examiner
UNITED STATES PATENTS

| | | | |
|---|---|---|---|
| 1,892,855 | 1/33 | Scheibel | 179—100.3 |
| 2,095,536 | 10/37 | Takats | 352—107 |
| 2,625,073 | 1/53 | Young et al. | 352—123 |
| 2,694,107 | 11/54 | Camras | 352—30 |
| 2,915,359 | 12/59 | Paine | 346—136 X |

JULIA E. COINER, *Primary Examiner.*

NORTON ANSHER, *Examiner.*